United States Patent
Liu et al.

(10) Patent No.: US 6,842,711 B2
(45) Date of Patent: Jan. 11, 2005

(54) POWER CALIBRATION SYSTEM

(75) Inventors: Hsing-Hua Liu, Pingjen (TW);
Yao-Jeng Huang, Taipei (TW); Lin Hsiao, Kaohsiung (TW)

(73) Assignee: Benq Corporation, Taoyuan (TW)

(*) Notice: Subject to any disclaimer, the term of this patent is extended or adjusted under 35 U.S.C. 154(b) by 76 days.

(21) Appl. No.: 10/422,855

(22) Filed: Apr. 25, 2003

(65) Prior Publication Data

US 2003/0208332 A1 Nov. 6, 2003

(30) Foreign Application Priority Data

May 1, 2002 (TW) ........................................ 91109098 A

(51) Int. Cl.[7] ........................ G01R 35/00; G11B 11/00; G01J 1/42
(52) U.S. Cl. ...................... 702/107; 702/60; 369/13.24; 369/13.26; 356/228
(58) Field of Search ........................... 702/107, 85, 57, 702/60; 369/13.02, 13.03, 13.24, 13.26; 356/218, 224, 228

(56) References Cited

U.S. PATENT DOCUMENTS 5,610,709 A * 3/1997 Arrington et al. .......... 356/218

FOREIGN PATENT DOCUMENTS

TW 374281 11/1999

* cited by examiner

Primary Examiner—Bryan Bui
Assistant Examiner—Meagan S Walling
(74) Attorney, Agent, or Firm—Rabin & Berdo, P.C.

(57) ABSTRACT

The present invention provides a high precision, low cost laser power calibration system. First, the photo signals output from a standard photo diode are received by a photo calibration system; then a set of standards consisting of the corresponding current signals and the power signals are saved in an EEPROM. Finally, the photo diode to be calibrated can be calibrated using the present system in accordance with the calibration standards.

21 Claims, 3 Drawing Sheets

POWER CALIBRATION SYSTEM

This application claims the benefit of Taiwan application Ser. No. 091109098, filed May 1, 2002.

BACKGROUND OF THE INVENTION

1. Field of the Invention

The invention relates in general to a power calibration system, and more particularly to a high precision, low cost power calibration system.

2. Description of the Related Art

As requirements for high volume storage mediums become greater, compact disks (CD) play a more important role. During the manufacturing process pits are created on the CD by the optical pickup unit (OPU) of the CD recorder when it emits a light beam on the dye layer; however, lands are formed on the CD when no light beam is emitted thereon. The pit has a lower reflectivity than the land and the pit and the land represent the information of 0 and 1 respectively.

However, pits produced by laser beams of different output power levels from different CD recorders are usually shaped differently, which will cause difficulty in the process of reading information. This is a result of the variation in the assembly of the OPU and inconsistencies in the photo diode properties. Therefore, the CD recorder has to have its laser power calibrated prior to the fab-out stage so that the OPU can provide laser beams of the correct power.

Traditionally, laser power is measured by a power meter and a sensor probe, which together cost about more than one thousands of US dollars. If each service center around the world must be equipped with such an apparatus, it increases manufacturing costs a great deal.

SUMMARY OF THE INVENTION

It is therefore an objective of the invention to provide a low cost, high precision power calibration system.

The power calibration system of the present invention comprises a computer, a laser diode, a photo detector, an current to voltage converter, an electrically erasable programmable read only memory (EEPROM), an A/D converter, an interface, and a microprocessor.

The photo detector is used to receive a laser beam from the laser diode and outputs a current signal to the current to voltage converter, which receives the current signal and outputs a voltage signal. The A/D converter receives the voltage signal and outputs a power signal input to the computer through the interface, and the interface is used for adjusting the communication protocol between the computer and the A/D converter. The microprocessor is used for controlling the transmission between the interface and the A/D converter.

First, a standard laser diode capable of emitting predetermined signal laser beams is used in the power calibration system first. The computer records this as a standard relation in the EEPROM, wherein the standard relation corresponds to the respective levels of the standard laser signals, standard current signals, and the standard power signals.

Then, in second stage, the computer reads the standard relation from EEPROM and the standard laser diode is replaced with a new laser diode which need to be calibrated. The computer commands the laser diode to be calibrated to emit a first laser signal, which will correspond to a first current signal and a first power signal. The computer compares the first current signal with the standard relation, and the first current signal is smaller than a second current signal and larger than a third current signal respectively. The second current signal and the third current signal respectively correspond to a second power signal and a third power signal. By using an interpolation method, the computer evaluates the corrected first power signal with the first current signal, the second current signal, the third current signal, the second power signal, and the third power signal.

Finally, the first laser signal is adjusted to fall within an acceptable range, and the corresponding corrected power signals are evaluated to complete the calibration process.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
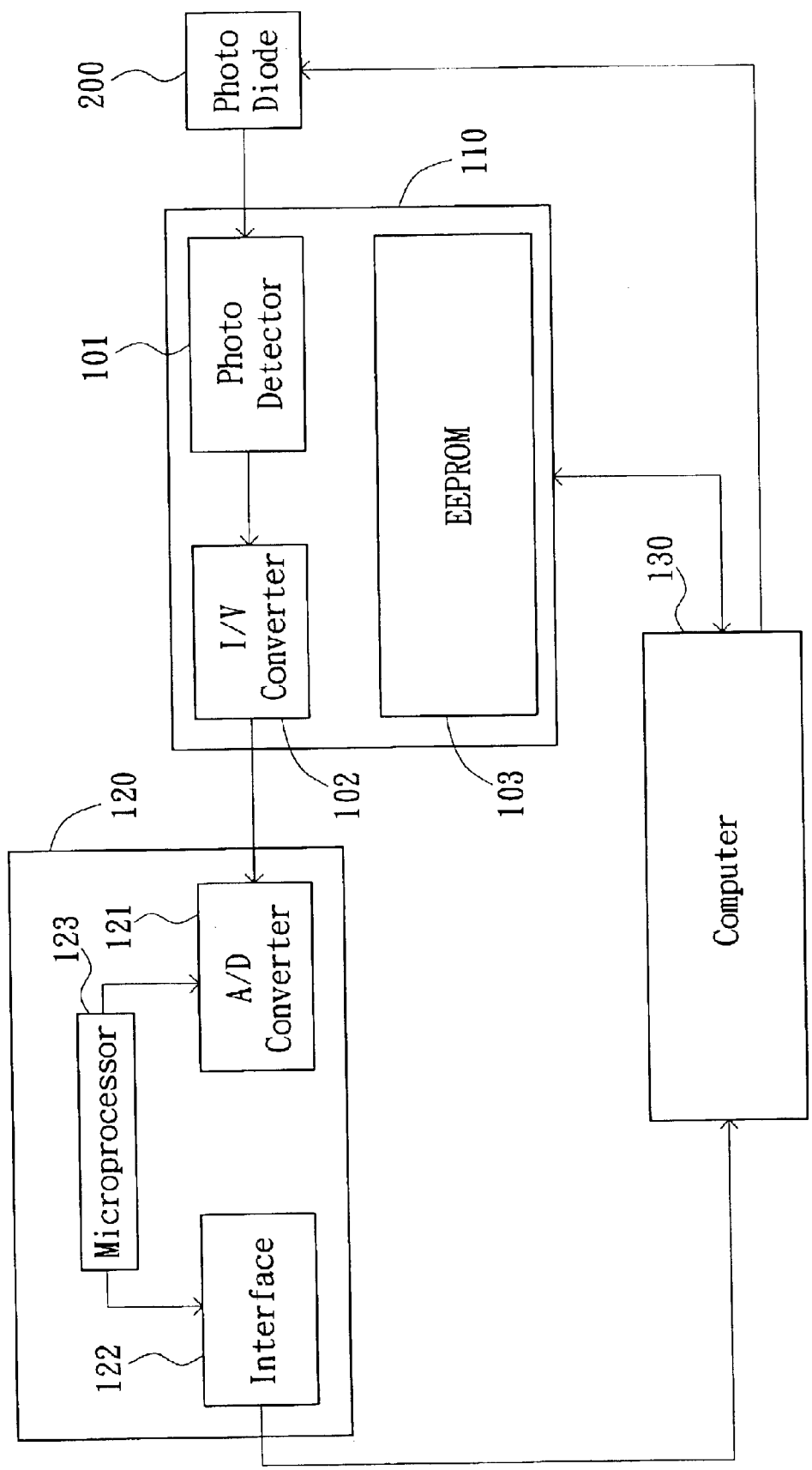
FIG. 1 illustrates the power calibration system according to the embodiment of the present invention.

FIG. 1 illustrates a high precision, low cost power calibration system. The power calibration system has a first module 110, a second module 120, and a computer 130. The first module 110 is used for receiving the light beam output from the photo diode 200. The second module 120 is used for digitizing the signal from the first module 110, so that the user can easily measure the power of the light beam.

The first module 110 is positioned in a jig and consists of a photo detector 101, an current to voltage converter 102, and an electrically erasable programmable read only memory (EEPROM) 103. The second module 120 consists of an A/D converter 121, an interface 122, and a microprocessor 123, wherein the interface 122 can be a RS232 interface.

The light beam, output from the photo diode 200, is received by the photo detector 101, which converts the photo signal of the light beam to a current signal. The current to voltage converter 102 receives the current signal from the photo detector 101, and converts the current signal to a voltage signal. The photo diode 200 can be a photo diode to be calibrated or a standard photo diode (golden sample), which can emit the light beam with correct power.

The analog voltage signal from the current to voltage converter 102 is sampled and converted to a digital signal by the A/D converter 121. The digital signal is usually represented as a unit of power, for instance mW. The digital signal is input to the computer 130 by interface 122. Interface 122 is used for adjusting the transmitting protocol between the computer 130 and the A/D converter 121. The microprocessor 123 is used for controlling the transmission of the AD converter 121 and the interface 122.

First, the characteristic of the photo detector 101 is recorded in EEPROM 103 by using a standard photo diode 200, a golden sample photo diode, which emits a light beam with the accurate power, in the range from 0 to 50 mW. The procedure as following: The computer 130 instructs the standard photo diode 200 to emit light beams with different power levels, for example, a range of from 0 to 50 mW and with a 0.2 mW step. Therefore, these power levels, respectively, 0 mW, 0.2 mW, 0.4 mW, 0.6 mW ..., 49.8 mW, and 50.0 mW. In the same time, photo detector 101 receives the light beam and generates a current whose amplitude related to the power levels instructed by the computer 30. Each power level which instructed by computer 130 corresponds to a current level which comes from the current to voltage converter 102. The computer 130 collects the standard relation of power level and current level, the characteristic of the photo detector 101, and saves them in the EEPROM 103.

The ideal power step is determined by the trade-off between precision and cost of memory. If a 0.05 mW step is selected so as to achieve a more precise power calibration, the volume of memory needed by EEPROM 103 to record the corresponding values as well as calibration cost would be increased. Hence, a 0.05 mW step is too precise to be practical. If a larger step, for instance 5 mW, is selected, precision will be adversely affected, especially in the low power range where there will be a decrease in linearity. If this step size were used, the ±5% precision requirement may not be achieved. Therefore, the calibration step is optimized when conducted between 0.2 mW to 0.6 mW to achieve the precision requirement of 5%.

After the standard relation is recorded in EEPROM 103, the standard photo diode 200 is replaced with a photo diode to be calibrated. The computer 130 reads the standard relation from EEPROM 103 and instructs the photo diode to be calibrated to progressively emit light beams of increasing power. The photo detector 101 receives the light beam from the photo diode to be calibrated and produces a first current. The first current is received by current to voltage converter 102, and converted to the first voltage. The level of the first voltage is digitalized and output from the interface 122 to the computer 130. The level of the first voltage also represents the power level of the light beam. For each current level, the computer 130 identifies two sets of measurements from the standard relation, where the standard current is closest to the first current. Then, a corrected power, corresponding to the first current, is evaluated by an interpolation method. Afterwards, the computer 130 commands the photo diode to be calibrated to emit the next light beam with a larger power. Upon repeating the steps described above, the calibration procedure for calibrating the photo diode will be completed.

For example, the computer 130 commands the photo diode to be calibrated to emit a light beam of ideal power $P_t$ mW, such as 0.2 mW, and the corresponding real current measured by the power calibration system is $i_r$ mA. Within the standard relation, two sets of current signals $i_1$ and $i_2$ are found, wherein $i_1$ and $i_2$ are closest in value to $i_r$, and obey the relation of $i_1 < i_r < i_2$. Using an interpolation method, a corrected power $P_t'$ is evaluated according to the following formula and is recorded in the EEPROM 103 by computer 130.

$$P_t' = \frac{P_1 - P_2}{i_1 - i_2} \cdot i_r + \left(P_1 - \frac{P_1 - P_2}{i_1 - i_2} \cdot i_1\right)$$

Then, the value of ideal power $P_t$ mW is changed to 0.4 mW, 0.6 mW ... sequentially, and the non-standard relation between the real current and the corresponding corrected powers $P_t'$ is also recorded in the computer 130. When a CD is being recorded, the photo diode emits light beams according to the corrected powers $P_t'$.

Therefore, the power calibration system of the present invention only needs to equip an EEPROM 103, which has recorded a set of standard relation from a standard photo diode. When a photo diode to be calibrated is applied in this power calibration system, a non-standard relation, recording the relation of the ideal power $P_t$, real current $i_r$ mA, and the corrected power $P_t'$, is recorded in the EEPROM by the computer 130. Even though a photo detector 101 with poor linearity is used, the photo diode to be calibrated can be calibrated within the precision requirement of 5% in the present invention.

Figure 2:
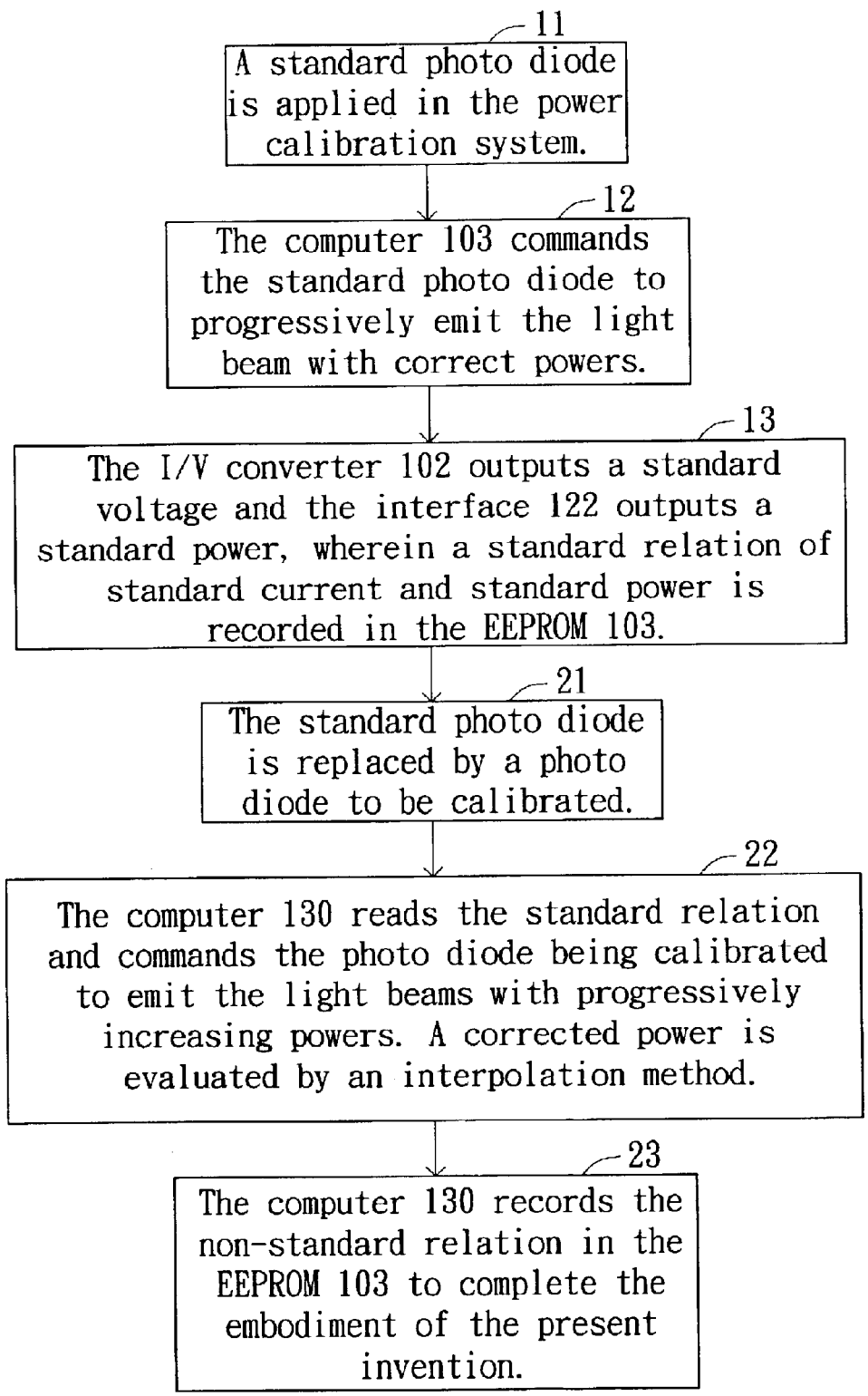
FIG. 2 illustrates the power calibration method of the present invention.

FIG. 2 shows the power calibration method of the present invention. The procedures from steps 11 to 13 illustrate the application of a standard photo diode in the present power calibration system, wherein a characteristic curve of the photo detector 101 is recorded in the EEPROM 103. The procedures from steps 21 to 23 illustrate the procedure of applying a photo diode to be calibrated in the present power calibration system.

First, in step 11, a standard photo diode is used in the power calibration system. Next, in step 12, the computer 130 instructs the standard photo diode to progressively emit a light beam with correct power. The light beam is received by the photo detector 101 to produce a standard current. In step 13, the current to voltage converter 102 outputs a standard voltage, and the interface 122 outputs a digitalized standard power level, wherein EEPROM 103 records the reference standards including standard current and standard power.

Then, in step 21, the standard photo diode is replaced by a photo diode to be calibrated. In step 22, the computer 130 reads the reference standards and commands the photo diode being calibrated to progressively emit light beams of increasing power levels. A corrected power is evaluated by the interpolation method. In step 23, the computer 130 records the non-standard relation in EEPROM 103 to complete the embodiment of the present invention.

Figure 3:
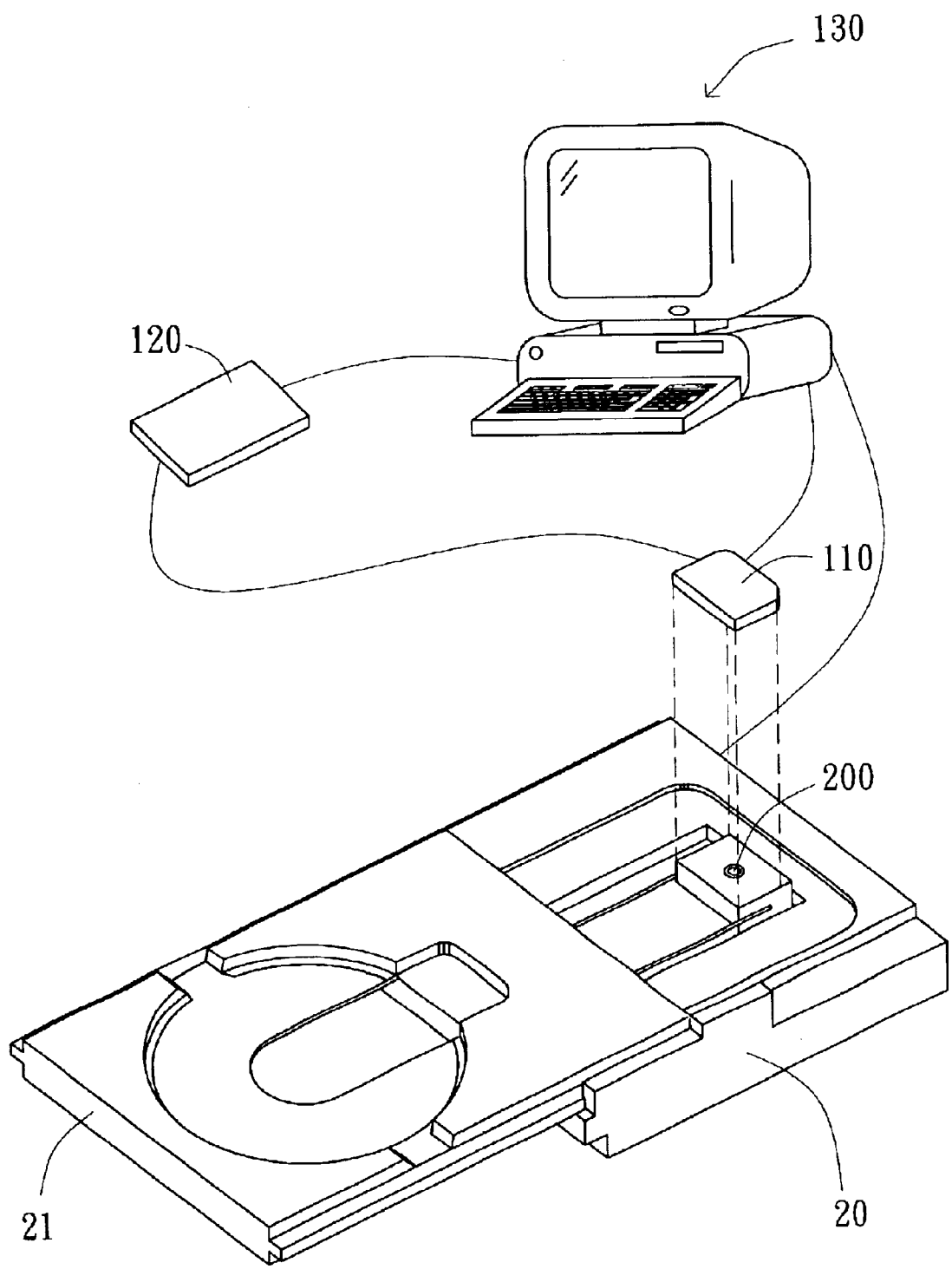
FIG. 3 shows the power calibration system for the laser diode of the optical recording drive.

The power calibration system and method thereof can be applied in any case calibration process is needed, such as for a laser diode. Referring to FIG. 3, it shows the power calibration system used for the laser diode 200 of the optical recording drive 20, wherein the laser diode 200 is positioned within the optical recording drive 20. The optical recording drive 20 comprises a CD plate 21, which can move in and out of the optical recording drive 20. The first module 110 is positioned upon the laser diode 200 in order to receive the laser beam from laser diode 200. The second module 120 is coupled to the first module 110 and the computer 130, and the computer 130 is coupled to the first module 110 and the optical recording drive 20.

From the above description, the power calibration system can calibrate a photo diode with acceptable precision even though some optical elements may have poor characters, such as a photo detector with poor linearity. It also decreases calibration costs without decreasing calibration precision.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A system for calibrating a signal producing apparatus, said signal producing apparatus being able to produce a plurality of signals having a first signal, said system comprising:

a detecting means used for receiving said plurality of signals and outputting a plurality of analog signals having a first analog signal which related to said first signal;

a measuring means used for receiving said plurality of analog signals and outputting a plurality of digital signals having a first digital signal which related said first analog signal;

a memory means used for saving a set of standards, wherein said standards are the corresponding relation between a plurality of standard signals and a plurality of standard digital signals, said plurality of standard signals being output from a standard signal producing apparatus, said plurality of standard signals being received and processed by said detecting means and said measuring means for generating said plurality of standard digital signals;

a judging means used for reading said standards from said memory means and receiving said first digital signal, wherein said first digital signal is larger than a second digital signal and smaller than a third digital signal, both said second digital and said third signal being in the range of said standards, said judging means further calibrating said first signal by using said first, second, and third digital signals.

2. The system according to claim 1, wherein said plurality of signals and said plurality of standard signals are photo signals.

3. The system according to claim 1, wherein said signal producing apparatus and said standard signal producing apparatus are respectively a laser diode to be calibrated and a standard laser diode able to emit laser beams with correct power.

4. The system according to claim 1, wherein said memory means is an electrically erasable programmable ROM (EEPROM).

5. The system according to claim 1, wherein said detecting means further comprises:

a signal receiver for receiving said plurality of signals and said plurality of standard signals, and for respectively outputting a plurality of current signals and a plurality of standard current signals; and a signal transformer for receiving said plurality of current signals and said plurality of standard current signals, and for respectively outputting a plurality of voltage signals and a plurality of standard voltage signals.

6. The system according to claim 5, wherein said signal receiver is a photo detector.

7. The system according to claim 5, wherein said signal transformer is an current to voltage converter.

8. The system according to claim 1, wherein said measuring means further comprises:

an A/D converter used for receiving said plurality of analog signals and said plurality of standard analog signals, and for respectively outputting said plurality of digital signals and said plurality of standard digital signals;

an interface used for receiving said plurality of digital signals and said plurality of standard digital signals, said interface coupled to said judging means and adjusting the communication protocol between said A/D converter and said judging means;

a microprocessor used for controlling the transmission between said A/D converter and said interface.

9. The system according to claim 8, wherein said interface is an RS232 interface.

10. The system according to claim 1, wherein said judging means evaluates said corrected first digital signal with an interpolation method.

11. The system according to claim 1, wherein said signal producing apparatus produces said plurality of signals according to an increasing or decreasing sequence, and the difference between two adjacent signals is from 0.2 mW to 0.6 mW.

12. The system according to claim 1, wherein said standard signal producing apparatus produces said plurality of standard signals according to an increasing or decreasing sequence, and the difference between two adjacent standard signals is from 0.2 mW to 0.6 mW.

13. A method for calibrating a signal producing apparatus, wherein said signal producing apparatus, a detecting means, a measuring means, and a memory means are coupled to a judging means, said detecting means is coupled to said measuring means, said method comprising:

(a) setting said signal producing apparatus as a standard signal producing apparatus;

(b) instructing said standard signal producing apparatus to emit a plurality of standard signals by said judging means, said detecting means receiving said plurality of standard signals and outputting a plurality of standard analog signals, said measuring means receiving said plurality of analog signals and outputting a plurality of digital signals to said judging means;

(c) recording said standard signals in said memory means by said judging means, wherein said standard relation is the corresponding relation between said plurality of standard signals and said plurality of standard digital signals;

(d) replacing said standard signal producing apparatus with a signal producing apparatus to be calibrated;

(e) reading said standard relation from said memory means by said judging means;

(f) instructing said signal producing apparatus to be calibrated to produce a first signal by said judging means, wherein a first analog signal is produced from said detecting means and a first digital signal is produced from said measuring means and input to said judging means;

(g) comparing said first analog signal with said standard relation by said judging means, wherein said first analog signal is larger than a second and smaller than a third analog signal among said standard relation, said second and third analog signals correspond to a second and third digital signals respectively; said judging means further evaluating a corrected first digital signal by interpolation method;

(h) commanding said signal producing apparatus to be calibrated to produce a second signal by said judging means and repeating the steps of (f)–(h).

14. The method according to claim 13, wherein said plurality of signal and said plurality of standard signal are photo signals.

15. The method according to claim 13, wherein said signal producing apparatus to be calibrated and said standard signal producing apparatus are respectively a laser diode to be calibrated and a standard diode able to emit photo signals of the correct power.

16. The method according to claim 13, wherein said memory means is an electrically erasable programmable ROM (EEPROM).

17. The method according to claim 13, wherein said detecting means further comprises:

a signal receiver for receiving said plurality of signals and said plurality of standard signals, and for respectively outputting a plurality of current signals and a plurality of standard current signals; and a signal transformer for receiving said plurality of current signals and said plurality of standard current signals, and for respectively outputting a plurality of voltage signals and a plurality of standard voltage signals.

18. The method according to claim 17, wherein said signal receiver is a photo detector.

19. The method according to claim 17, wherein said signal transformer is an current to voltage converter.

20. The method according to claim 13, wherein said measuring means further comprises:

an A/D converter used for receiving said plurality of analog signals and said plurality of standard analog signals, and for respectively outputting said plurality of digital signals and said plurality of standard digital signals;

an interface used for receiving said plurality of digital signals and said plurality of standard digital signals, said interface coupled to said judging means and adjusting the communication protocol between said A/D converter and said judging means;

a microprocessor used for controlling the transmission between said A/D converter and said interface.

21. The system according to claim 20, wherein said interface is a RS232 interface.

* * * * *